Feb. 16, 1937. H. C. A. BEHR ET AL 2,071,293
AUTOMATIC ROASTER
Filed May 19, 1936 2 Sheets-Sheet 2

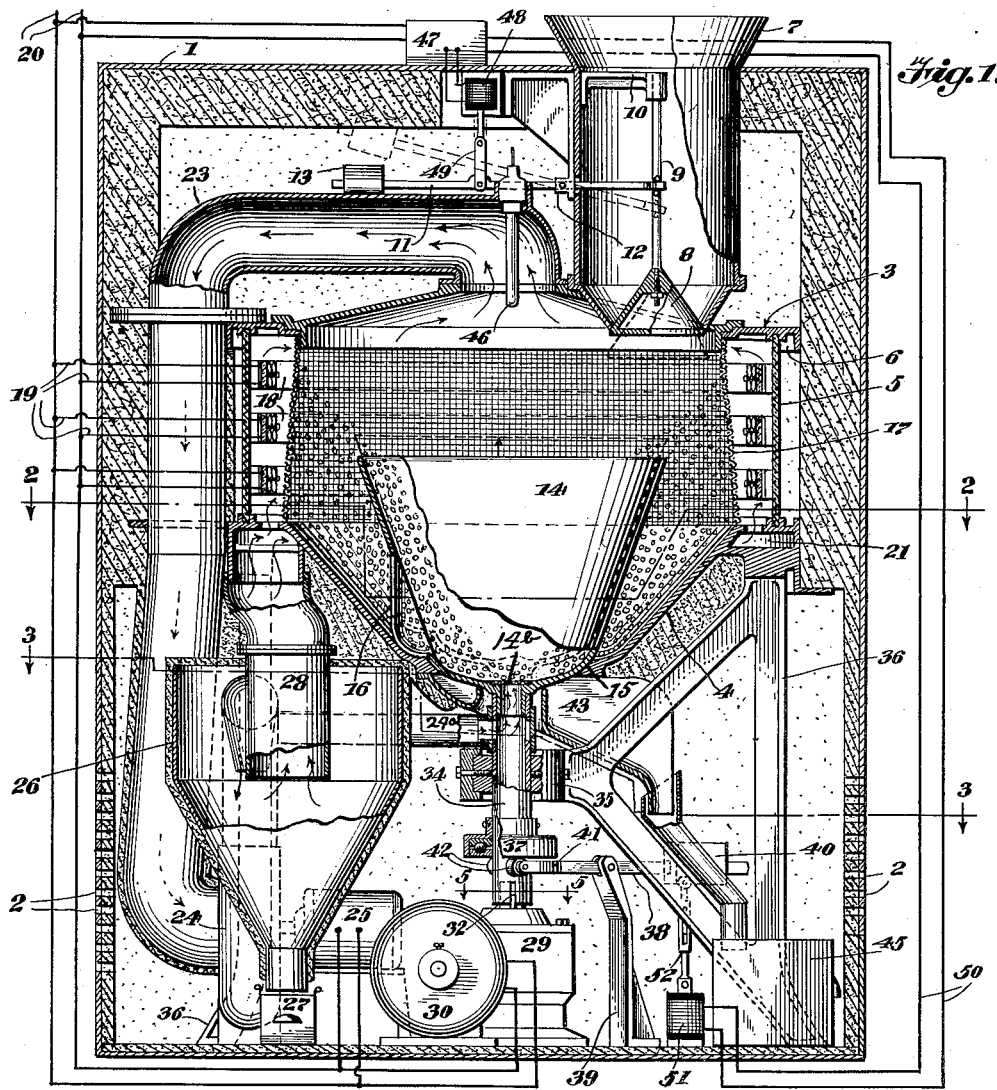
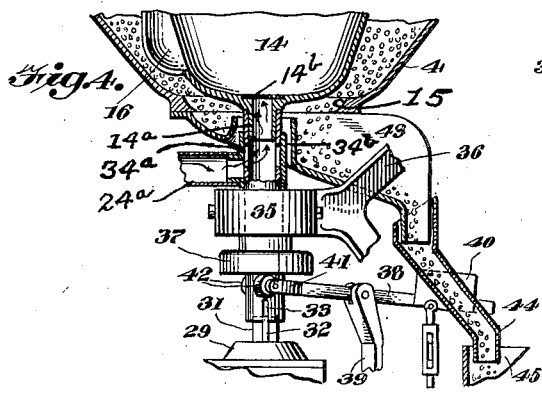
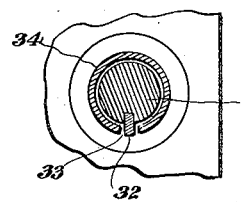

Inventors:
HARRY C. A. BEHR
AND JULES J. ECK.

By E. E. Vrooman & Co.
Attorneys

Patented Feb. 16, 1937

2,071,293

UNITED STATES PATENT OFFICE 2,071,293

AUTOMATIC ROASTER

Harry C. A. Behr and Jules J. Eck, York, Pa., assignors to Yorktown Electric Roaster Manufacturing Corporation, York, Pa., a corporation of Pennsylvania Application May 19, 1936, Serial No. 80,600

7 Claims. (Cl. 34—9)

This invention relates to an automatic roaster for roasting different foods, such as coffee and the like.

An object of this invention is the construction of a simple and efficient roaster of an upright or vertical type.

Another object of our invention is the construction of an efficient roaster which can be easily installed in a store or building for handling automatically, preferably small quantities of coffee, as the operator desires.

A further object is the construction of a coffee roaster which operates automatically for receiving the beans, efficiently roasting same and then automatically discharging the roasted coffee in predetermined quantities.

A still further object of the invention is the construction of a relatively compact roaster which is particularly adapted for efficiently handling coffee in stores, whereby a customer can be quickly and efficiently supplied with strictly fresh-roasted coffee in a minimum amount of time.

Another object is the construction of a novel coffee roaster in which means is employed for causing the coffee to have a centrifugal action, during the roasting period, whereby the coffee is evenly roasted prior to being automatically discharged, when the roasting is completed.

With the foregoing and other objects in view, our invention comprises certain novel constructions, combinations and arrangements of parts as will be hereinafter fully described, illustrated in the accompanying drawings and more particularly pointed out in the appended claims.

In the drawings:

Figure 1 is a vertical, central sectional view of an automatic roaster constructed in accordance with this invention, a few parts being shown in side elevation.

Figure 4 is a fragmentary sectional view of the mechanism showing particularly the mixing hopper in an elevated position for allowing the coffee or food to be discharged.

Figure 5 is a horizontal sectional view taken on line 5—5, Fig. 1, and looking in the direction of the arrows.

Figure 2:
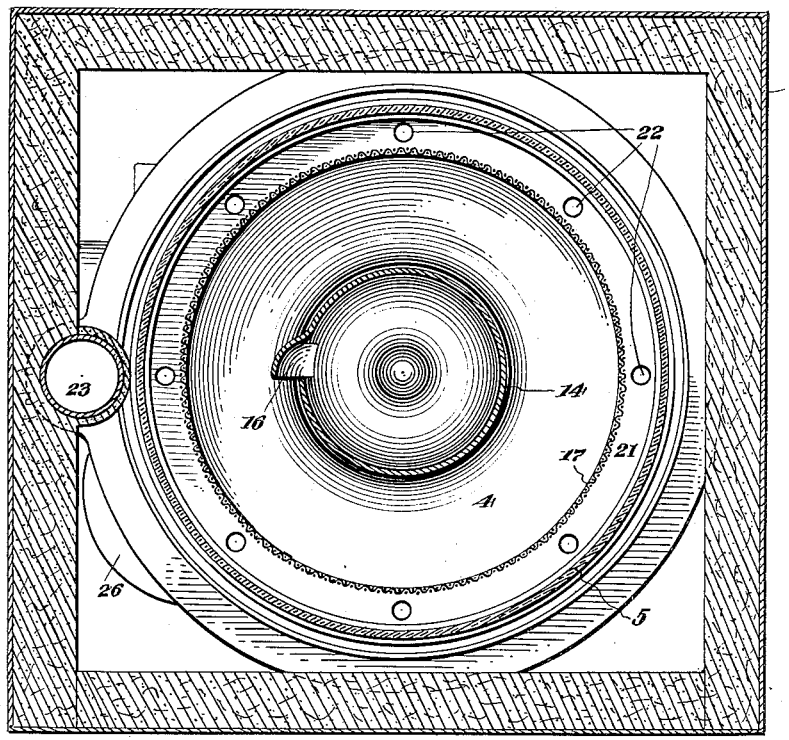
Figure 2 is a horizontal sectional view taken on line 2—2, Fig. 1 and looking in the direction of the arrows.

Referring to the drawings, in which we have shown the preferred embodiment of our invention, 1 designates a suitable casing or cabinet in which our roasting mechanism is placed. This cabinet 1 is provided in its sides with suitable air inlets 2 (Fig. 1). A container 3 is placed in the cabinet 1 and comprises a hopper-like bottom 4 with a non-conducting shell 5 thereabove and resting on the upper edge of shell 5 is a top 6. Connected with top 6 is a charging hopper 7. A cone-shape valve 8 normally closes the lower end of charging hopper 7. This valve 8 is provided with an upstanding stem 9, which stem works in bracket 10. A lever 11 is pivotally mounted at 12, with its inner end pivotally connected to stem 9. A suitable weight 13 is carried by lever 11 near its outer end. This weighted lever 11 normally retains valve 8 in a closed position.

A stirring or mixing hopper 14 is mounted within the container 3, and this hopper is preferably in shape like an inverted cone. The mixing hopper normally rests on valve seat 15 (Fig. 4), thereby preventing discharge of the coffee from the container. We are using the term "coffee" in specifying the food that our roaster is admirably adapted to handle, but we want it to be understood that the roaster can handle equally as efficiently as coffee other foods when desired. The mixing hopper is provided with a side inlet 16 (Fig. 2), constituting a scoop, whereby coffee is "picked up" from the inside of the hopper-like bottom and swept into the mixing hopper, and as said hopper is rapidly revolved, it will whirl the coffee and cause it to have a centrifugal action within the container. A circular screen 17 is placed in the container with its lower edge in contact with substantially the top of the hopper-like bottom 4. This screen 17 converges towards its top, making it more congested to create a better mixing of the agitated coffee within the container.

The non-conducting shell 5 may be made of a specially processed asbestos substance whereby it is highly non-conductive. Arranged upon the inner face of shell 5 are a plurality of ring-like electrical heating units 18, which are each electrically connected to a source of electrical energy by means of wires 19. These wires 19 are connected to wires 20, and wires 20 are connected in any suitable manner to a switch (not shown) and a source of electrical energy. It is to be noted that the ring-like electrical heating units 18 are placed behind or outside of the screen 17, whereby the coffee beans are prevented from coming in contact with said heating units. In the upper part of the hopper-like bottom 4 is a circular air duct 21, which has a plurality of discharge outlets or openings 22 (Fig. 2) in its upper wall. These outlets 22 allow heated air to pass up and around the electrical heating units and thence into the roasting chamber of the container.

A large suction conduit or pipe 23 is connected at its upper end to the top of the container so as to allow air, dust, chaff and the like to be drawn from the container and thence discharged into the exhaust blower 24 that is actuated by blower motor 25. From the exhaust blower 24 the air and dust passes into the dust collector 26, wherein the foreign substance passes into the dust bin 27, while the clean heated air is sucked up through the lower end of pipe 28 and thence passes into the circular air duct 21 as is clearly shown in Fig. 1.

A reducer 29 is operated by motor 30, and this reducer 29 is provided at its top with an upstanding stub shaft 31; shaft 31 is preferably provided with a spline 32 which is slidably mounted in slot 33 (Fig. 5) of the shaft-like sleeve 34. The mixing hopper 14 is provided with a depending stem 14a, which is fixedly secured in the upper end of sleeve 34; therefore, it will readily be seen that when sleeve 34 is raised and lowered, like movement will be imparted to the mixing hopper 14. In Figure 1 the mixing hopper is shown in a closed position, while in Figure 4 it is shown in an open position, resulting from the vertical adjustment of sleeve 34. Of course, it is to be understood that mixing hopper 14 and stub shaft 13 will be synchronously rotated during the operation of the reducer 29. The sleeve 34 is mounted in oilless bearing 35 that is carried by one of the legs 36 (Fig. 1) of the mechanism. A thrust ball bearing 37 is fixedly secured to sleeve 34 under the bearing 35. A lever 38 is pivotally mounted on bracket 39. This lever is provided near its outer end with a suitable weight 40 and at its inner end is provided with a yoke 41 on the ends of which yoke are roller bearings 42. These roller bearings press against the under face of the thrust ball bearing 40, so that when lever 38 is pulled down at its outer end the sleeve 34 will be raised to move the mixing hopper to an unseated position, off valve seat 15, and thus open the container for allowing the coffee to be discharged into the pan 43 and thence to spout 44 into the material receiving hopper 45.

Figure 3:
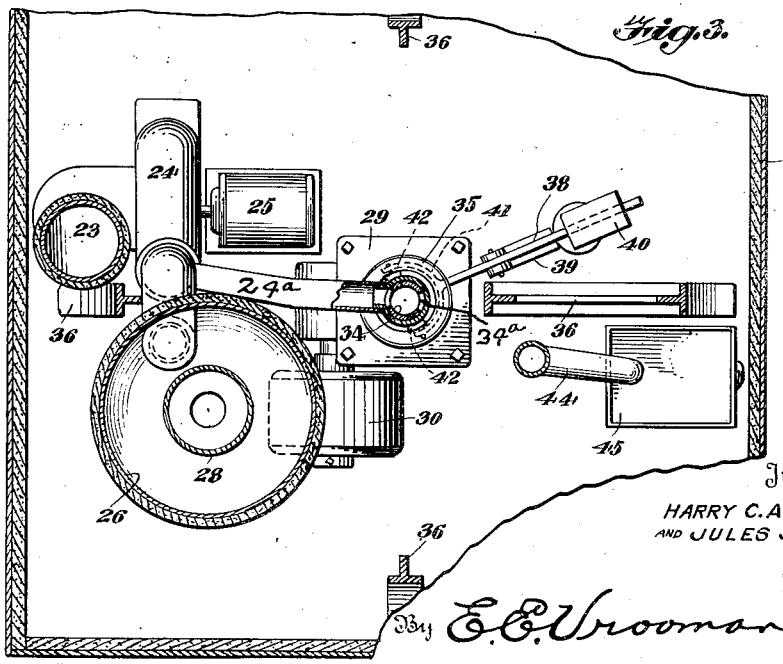
Figure 3 is a horizontal sectional view taken on line 3—3, Fig. 1 and looking in the direction of the arrows.

To prevent a "dead spot" in the center of the revolving mixing hopper 14 and to create a perfect circulation at the center of said mixing hopper we provide an air blast by having the depending stem 14a hollow with screen 14b (Fig. 4) over its upper end. The sleeve 34 is provided with a plurality of elongated openings 34a that register with the branch blow pipe 24a (Fig. 3). This pipe 24a communicates with pipe or conduit 24 so that an air blast is passed into the mixing hopper at its center, to raise any dormant beans, rapidly blowing the beans into the drying chamber of the container, whereby a highly satisfactory roasting of the beans is obtained. The sleeve-engaging end of pipe 24a constitutes a hollow oilless bearing 34b. The elongated openings 34a are sufficient in length to allow air to pass into the hopper 14 at all times, whether said hopper is in a closed position (Fig. 1) or open (Fig. 4). The hollow sleeve 34 is suitably closed towards its lower end to prevent any foreign substance or air under pressure coming in contact with the top of the stub shaft 31. It will, therefore, be understood that we have provided air in a container for circulating or mixing the coffee beans, whereby they are efficiently roasted.

It is to be noted that as the air is sucked into the dome of the container and thence into the large pipe 23, it passes a thermostat control 46 (Fig. 1).

It is also to be understood that the screen 17 serves as a deflector screen for the air and the chaff, and it has the ability to create a whirl pool and thereby causing a thorough mixing of the beans and the heated air. It is also to be noted that the asbestos insulating ring or shell 5 serves the purpose of maintaining the heat, also to prevent a fire, and is an excellent electrical insulation for the heating units upon which the units are mounted.

A timing unit 47 is employed which is electrically connected to an electrical solenoid device 48. This device 48 is pivotally connected by means 49 to the lever 11, so that when the solenoid device 48 is operated valve 8 will also be operated, either to open or close the same. The timing device 47, through wires 50 is connected to the electrical solenoid device 51. This device 51 is pivotally connected in a suitable manner to lever 38 through means 52, whereby when the solenoid device 51 is operated lever 38 will likewise be operated for raising and lowering the mixing hopper within the container; in other words, we have shown automatic electrical means for opening and closing the container through the vertical bodily movement of the mixing hopper. Consequently, it will be seen that this hopper 14 acts as a valve; in other words, it is a valve as well as means for imparting centrifugal movement to the coffee beans within the container, which is a very simple and efficient construction.

The wires 20 are suitably connected to motors 25 and 30 whereby when the circuit is closed by preferably operating a switch (not shown) the blower will be operated as well as the mixing hopper, whereby the roaster is ready to receive a supply of coffee beans to be roasted. The timing device or unit 47 controls both the supply of beans to the container and the discharge of the roasted coffee from the container. Through this timing unit the amount of coffee discharged through hopper 7 is controlled to a nicety and the duration of roasting is also controlled, for the timing unit controls the solenoid device 51 which in turn controls the opening of the valve-hopper 14. Therefore, we have shown and described an automatic roaster wherein predetermined quantities of coffee are supplied to be roasted, and when properly roasted it is automatically discharged.

The mechanism is suitably insulated as shown in the drawings for confining the heat, and eliminating the possibility of fire. We make no claim to the insulation and, therefore, have not applied reference numerals to the different layers shown, as the insulation is merely optional, and can be utilized in each specific case as the operator desires.

We have found from practical experience that by reason of the novel construction of the mixing hopper and its valve seat, the rotation of the hopper will not be interfered with but when discharging action is desired, it will quickly move to the raised position shown in Figure 4, allowing the roasted coffee to pass through from the container. Of course, the action of the solenoid device 51 is timed accurately to allow this discharging action and when such action is complete the device 51 will then permit the mixing hopper to drop or move to its closed position upon valve seat 15, whereupon solenoid device 48 will operate lever 11 to its open dotted position shown in Fig. 1, allowing a suitable quantity of unroasted coffee beans to drop into the container, whereupon this new supply will be taken up, so to speak, by the mixing hopper and whirled in a centrifugal motion, for causing a thorough mixing and roasting within the container, prior to being discharged in a predetermined timed period, into the receiving hopper 45.

The circulation of heated air is continuous, during the operation of the roaster, from the container to the blower thence to the dust collector and thence through pipe 28 and circular air duct 21 again into the container.

While we have described the preferred embodiment of our invention and illustrated the same in the accompanying drawings, minor changes or alterations may appear to one skilled in the art to which this invention relates during the extensive manufacture of the same, and we, therefore, reserve the right to make such changes or alterations as shall fairly fall within the scope of the appended claims.

What we claim is:

1. In an automatic roaster, the combination of a container provided with a discharge opening, a vertically movable mixing hopper in said container and closing said opening, said mixing hopper provided with an inlet opening, and means for actuating said mixing hopper.

2. In an automatic roaster, the combination of a container including a non-conducting shell and a hopper-like bottom below said shell, a screen above said bottom and inside of said container and enclosed by said non-conducting shell, electrical heating means behind said screen and supported upon said shell, and mixing means within said container and engaging said hopper-like bottom.

3. In an automatic roaster, the combination of a container provided with a hopper-like bottom, said hopper-like bottom provided at its top with a horizontally circular air duct, said air duct provided in its horizontally circular top with a plurality of outlets opening into said container, means connecting with the top of said container for drawing air therefrom, and mixing means in said container.

4. In an automatic roaster, the combination of a container provided with a discharge opening, a mixing hopper provided with a depending stem normally closing said opening, a sleeve fixedly secured to said stem, a thrust bearing fixedly secured to said sleeve, means for rotating said sleeve and mixing hopper, and means engaging said thrust bearing for raising and lowering said sleeve and mixing hopper.

5. In an automatic roaster, the combination of a container provided in its bottom with a valve seat and a discharge pan under said seat, a mixing hopper normally resting on said valve seat and having a portion extending through said discharge pan, a shaft-like sleeve connected at its inner end to the extending portion of the mixing hopper, said sleeve provided at its outer end with means for slidably engaging and holding against independent rotary movement a stub shaft therewith, a stub shaft in engagement with said outer end, means for rotating said stub shaft, and means for raising and lowering said sleeve, whereby similar action is imparted to said mixing hopper during rotary movement of said mixing hopper.

6. In an automatic roaster, the combination of a container provided with a plurality of vertically-aligned ring-like horizontally-positioned heating units at the sides of said container, vertical insulating means engaging and supporting said heating units upon said container, a screen in front of said heating units, and mixing means inside of said screen and within said container.

7. In an automatic roaster, the combination of a container provided with a discharge opening, a vertically movable mixing hopper in said container and closing said opening, said mixing hopper provided with a side inlet constituting a scoop, and means for actuating said mixing hopper.

HARRY C. A. BEHR.
JULES J. ECK.